United States Patent
Schmidt et al.

(10) Patent No.: US 12,523,803 B2
(45) Date of Patent: Jan. 13, 2026

(54) RETROREFLECTIVE ARTICLE INCLUDING A NON-REFLECTIVE CONFORMAL WAVELENGTH-SELECTIVE RADIATION ABSORBING COATING LAYER, AND METHODS OF MAKING SAME

(71) Applicant: 3M INNOVATIVE PROPERTIES COMPANY, St. Paul, MN (US)

(72) Inventors: Daniel J. Schmidt, Woodbury, MN (US); Reema Chatterjee, Woodbury, MN (US); Kui Chen-Ho, Woodbury, MN (US); Benjamin R. Coonce, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 777 days.

(21) Appl. No.: 16/963,268

(22) PCT Filed: Mar. 26, 2019

(86) PCT No.: PCT/IB2019/052449
§ 371 (c)(1),
(2) Date: Jul. 20, 2020

(87) PCT Pub. No.: WO2019/186397
PCT Pub. Date: Oct. 3, 2019

(65) Prior Publication Data
US 2021/0364678 A1 Nov. 25, 2021

Related U.S. Application Data

(60) Provisional application No. 62/650,381, filed on Mar. 30, 2018.

(51) Int. Cl.
*G02B 5/08* (2006.01)
*G02B 5/122* (2006.01)
(Continued)

(52) U.S. Cl.
CPC .............. *G02B 5/124* (2013.01); *G02B 5/122* (2013.01); *G02B 5/223* (2013.01); *G02B 5/0825* (2013.01)

(58) Field of Classification Search
CPC ...... G02B 5/0825; G02B 5/122; G02B 5/124; G02B 5/208; G02B 5/22; G02B 5/223
See application file for complete search history.

(56) References Cited

U.S. PATENT DOCUMENTS

| 2,407,680 | A | 9/1946 | Palmquist |
| 3,700,305 | A | 10/1972 | Bingham |

(Continued)

FOREIGN PATENT DOCUMENTS

| CN | 105359008 | 2/2016 |
| CN | 105359009 | 2/2016 |

(Continued)

OTHER PUBLICATIONS

RoadVista, "Model 932 Multi-Geometry Handheld Retroreflectometer", (2018), 2 pages.

(Continued)

*Primary Examiner* — Ryan S Dunning
(74) *Attorney, Agent, or Firm* — Adrian L. Pishko (57) ABSTRACT

The present disclosure provides a retroreflective article. The retroreflective article includes a retroreflective layer including a number of cube corner elements that collectively form a structured surface that is opposite a major surface, and a conformal wavelength-selective radiation absorbing coating layer adjacent to the structured surface. The present disclosure also provides a method of making a retroreflective article. The method includes obtaining a retroreflective layer, and forming a conformal wavelength-selective radiation absorbing coating layer on the retroreflective layer by applying a first material having a first binding group to the (Continued)

structured surface, and applying a second material having a second binding group to the first material. The conformal wavelength-selective radiation absorbing coating layer absorbs radiation of at least one selected wavelength and can impart color (or absorption of at least one wavelength outside of the colored wavelength range) to retroreflective light of the retroreflective article.

15 Claims, 4 Drawing Sheets

(51) Int. Cl.
*G02B 5/124* (2006.01)
*G02B 5/20* (2006.01)
*G02B 5/22* (2006.01)

(56) References Cited

U.S. PATENT DOCUMENTS

| | | | |
|---|---|---|---|
| 3,712,706 | A | 1/1973 | Stamm |
| 4,025,159 | A | 5/1977 | Mcgrath |
| 4,576,850 | A | 3/1986 | Martens |
| 4,588,258 | A | 5/1986 | Hoopman |
| 5,229,882 | A * | 7/1993 | Rowland .......... B29D 11/00605 156/247 |
| 5,422,756 | A | 6/1995 | Weber |
| 5,450,235 | A | 9/1995 | Smith |
| 5,962,121 | A | 10/1999 | Mori |
| 6,172,810 | B1 | 1/2001 | Fleming |
| 7,140,741 | B2 | 11/2006 | Fleming |
| 7,611,251 | B2 | 11/2009 | Thakkar |
| 7,862,187 | B2 | 1/2011 | Thakkar |
| 8,234,998 | B2 | 8/2012 | Krogman |
| 8,534,849 | B2 | 9/2013 | Coggio |
| 9,453,949 | B2 | 9/2016 | Nand |
| 9,971,074 | B2 | 5/2018 | Chatterjee |
| 10,281,623 | B2 | 5/2019 | McCoy |
| 2006/0087735 | A1 * | 4/2006 | Nilsen .................... G02B 5/223 359/530 |
| 2010/0265584 | A1 | 10/2010 | Coggio |
| 2010/0277801 | A1 | 11/2010 | Nakajima |
| 2011/0014366 | A1 * | 1/2011 | Nogueira ................ G02B 5/208 977/902 |
| 2012/0038984 | A1 | 2/2012 | Patel |
| 2012/0092756 | A1 | 4/2012 | Yoshida |
| 2013/0034682 | A1 | 2/2013 | Free |
| 2013/0114143 | A1 | 5/2013 | Thakkar |
| 2013/0273242 | A1 | 10/2013 | Krogman |
| 2015/0168614 | A1 * | 6/2015 | Running ................ G02B 5/124 359/530 |
| 2016/0139306 | A1 | 5/2016 | Chatterjee |
| 2016/0209558 | A1 | 7/2016 | Chatterjee |
| 2017/0192142 | A1 | 7/2017 | Niwas |
| 2017/0357039 | A1 | 12/2017 | Ueda |

FOREIGN PATENT DOCUMENTS

| | | |
|---|---|---|
| CN | 105473325 | 4/2016 |
| CN | 105940325 | 9/2016 |
| JP | 2017-177481 | 5/2017 |
| WO | WO 2001-079897 | 10/2001 |
| WO | WO 2002-055570 | 7/2002 |
| WO | WO 2011-091132 | 7/2011 |
| WO | WO 2011-129833 | 10/2011 |
| WO | WO 2012-135595 | 10/2012 |
| WO | WO 2012-166460 | 12/2012 |
| WO | WO 2015-002814 | 1/2015 |
| WO | WO 2016-039820 | 3/2016 |
| WO | WO 2017-004247 | 1/2017 |
| WO | WO 2018-217519 | 11/2018 |
| WO | WO 2019-084287 | 5/2019 |
| WO | WO 2019-118685 | 6/2019 |

OTHER PUBLICATIONS

Decher, "Fuzzy nanoassemblies: Toward Layered Polymeric Multicomposites", Science, 1997, vol. 277, No. 5330, pp. 1232-1237.
Iler, "Multilayers of colloidal particles", Journal of colloid and interface science, 1966, vol. 21, pp. 569-594.
Krogman, "Automated Process for Improved Uniformity and Versatility of Layer-by-Layer Deposition", Langmuir, 2007, vol. 23, pp. 3137-3141.
Krogman, "Industrial-scale spray layer-by-layer assembly for production of biomimetic photonic systems", Bioinspiration & Biomimetics, 2013, vol. 8, 12 pages.
Seyrak, "Layer-by-Layer Assembly of Multifunctional Hybrid Materials and Nanoscale Devices", Elsevier, 2012, pp. 159-185.
International Search report for PCT International Application No. PCT/IB2019/052449 mailed on Jun. 11, 2019, 2 pages.

* cited by examiner

RETROREFLECTIVE ARTICLE INCLUDING A NON-REFLECTIVE CONFORMAL WAVELENGTH-SELECTIVE RADIATION ABSORBING COATING LAYER, AND METHODS OF MAKING SAME

CROSS REFERENCE TO RELATED APPLICATIONS

This application is a national stage filing under 35 U.S.C. 371 of PCT/IB2019/052449, filed Mar. 26, 2019, which claims the benefit of U.S. Application No. 62/650,381, filed Mar. 30, 2018, the disclosure of which is incorporated by reference in its/their entirety herein.

TECHNICAL FIELD

The present disclosure broadly relates to radiation-absorbing retroreflective articles and methods of making such retroreflective articles.

BACKGROUND

Retroreflective articles are characterized by their ability to redirect light to its originating source. Retroreflective articles have found use in a variety of applications, such as in, for example, safety clothing, traffic signs, validation stickers, license plates, and secure documents.

Retroreflective articles (e.g., sheeting) generally include at least one of two types of optical elements: transparent glass or ceramic microspheres (beads), and cube corners (also referred to as prisms or microprisms). Cube corners may be further divided into truncated cube corners and full cube corners (also referred to as preferred geometry (PG) cube corners). The base edges of adjacent cube corner elements of truncated cube corner arrays are typically coplanar. Preferred geometry cube corner elements typically comprise at least two non-dihedral edges that are not coplanar. PG cube corners typically exhibit a higher total light return in comparison to truncated cube corner elements. Exemplary beaded retroreflective articles are described in, for example, U.S. Pat. No. 2,407,680 (Palmquist et al.). Exemplary cube corner retroreflective articles are described in, for example, U.S. Pat. No. 5,450,235 (Smith et al.).

Cube corner retroreflective sheeting, sometimes referred to as prismatic sheeting, typically comprises a thin transparent layer having a substantially planar front surface and a rear structured surface comprising a plurality of geometric structures, some or all of which include three reflective faces configured as a cube corner element. In some embodiments, the cube corners are integral with the substantially planar front surface. In these embodiments, the substantially planar front surface is also referred to as a land layer. In other embodiments, the substantially planar front surface may be a separate layer from the cube corner elements. In such embodiments, the substantially planar layer may be referred to as body layer.

Some cube corner retroreflective articles may include a sealing layer which enables formation of a low refractive index area (e.g., an air gap) between the sealing layer and the cube corner elements. The air gap behind cube corner elements allows light incident on the cube corner element and encounter active portions of the faces of the cube corner element to be retroreflected. This dielectric face reflectivity is referred to as total internal reflection (TIR). Active portions of cube corner elements depend, for example, on cube corner geometry, cube axis cant and refractive index of the cube corner element material. Advantages of TIR-based retroreflective sheeting include increased daytime brightness and improved appearance of colored articles. Because TIR depends on light encountering active portions of cube corner elements, retroreflectivity for TIR cube corner sheeting is acceptable at small entrance angles but significantly reduced at higher entrance angles. At high entrance angles, light will typically refract (e.g., pass through the face) and be "lost". Further, other factors impact retroreflectivity of TIR cube corner elements and as a result, not all incident light encountering active portions of the cube corner elements will be totally internally reflected.

Alternatively to TIR-based sheeting, cube corner elements may be adjacent to or coated with a metal coating. In such embodiments the cube corner elements are referred to as metallized cube corner elements. Metallization results in specular retroreflection of light incident on the retroreflective article. Metallization allows the retroreflective sheeting to be protected along the back surface, preventing dirt and moisture from penetrating the construction. It also provides additional strength to the overall article. Disadvantages of metallized constructions include gray appearance of the retroreflective.

Metallized cube corner sheetings have lower overall retroreflectivity than sealed sheetings. Unlike TIR, for which reflectance is 100%, aluminum has a reflectance of only about 85%. Despite lower total light return, metallized sheetings typically perform better under nighttime conditions than sealed (TIR) cube corner sheetings, considering all incidence and orientation angles.

Alternatively, and in lieu of metallic coatings or sealing layers, dielectric mirrors may be used, such as described, for example, in U.S. Pat. No. 3,700,305 (Bingham) which describes beaded retroreflective sheetings comprising dielectric mirrors. U.S. Pat. No. 6,172,810 (Fleming et al.) describes retroreflective articles that have a multilayer reflective coating that includes multiple polymer layers disposed in optical association with a layer of optical elements, wherein the overall multilayer reflective coating reflects light in a desired wavelength range. PCT Publication No. WO 2016/039820 (McCoy et al.) describes exposed lens retroreflective articles comprising a self-assembled dielectric mirror.

To impart color to a prismatic, retroreflective article, a colored layer is typically incorporated onto the planar side of the sheeting. PCT Publication No. WO 01/79897 (Coderre et al.), for instance, describes a pigmented layer having pigmented indicia thereon, disposed on a retroreflective cube layer. Due to the outdoor usage of sheeting in signage applications, conspicuity markings, and pavement markings, however, there is a need for stability against environment challenges such as UV degradation and abrasion. Typically, an abrasion-resist top coat with light stabilizing packages is applied on top of the colored layer.

SUMMARY

In a first aspect, a retroreflective article is provided. The retroreflective article includes a retroreflective layer including a plurality of cube corner elements that collectively form a structured surface that is opposite a major surface; and a conformal wavelength-selective radiation absorbing coating layer adjacent to the structured surface.

In a second aspect, a method of making a retroreflective article is provided. The method includes obtaining a retroreflective layer including a plurality of cube corner elements that collectively form a structured surface opposite a major surface; and forming a conformal wavelength-selective radiation absorbing coating layer by applying a first material having a first binding group to the structured surface, and applying a second material having a second binding group to the first material. The conformal wavelength-selective radiation absorbing coating layer absorbs radiation of at least one selected wavelength.

Retroreflective articles according to at least certain embodiments of this disclosure were found to provide both retroreflective color and color in ambient light to the retroreflective article, without significant loss of the article's retroreflectivity.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

While the above-identified figures set forth several embodiments of the disclosure, other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

Glossary

The term "adjacent" as used herein refers to a material or a layer that can either be in contact with another material or layer (i.e., directly adjacent), or separated from another material or layer by an intermediary material, layer, or gap.

The term "entrance angularity" is commonly used to describe the retroreflective performance of retroreflective articles as a function of the entrance angle of light incident on the article and the orientation of the article. The entrance angle of incident light is typically measured with respect to an axis that extends normal to the base surface of the article. The retroreflective performance of an article may be expressed as a percentage of the total light incident on the face of the article which is returned by the article at a particular entrance angle (total light return, TLR).

The term "observation angularity" is commonly used to describe the retroreflective performance of retroreflective articles as a function of varying observation angles and the orientation of the article.

The term "conformal" as used herein means that a material or layer follows the contour, or matches the shape of an adjacent surface. In other words, a conformal coating layer adjacent a structured surface, for example, will have a substantially identical shape to the structured surface.

The term "coating" as used herein is meant to encompass both a liquid coating and/or a layer formed by application of the coating. It will be clear to the skilled artisan in the context of the present application when the term "coating" refers to the liquid coating and when it refers to the formed layer. In some instances, the formed layer will be expressly described as "coating layer". The term "surrounds" as used herein refers to the manner in which a first material is disposed completely around (i.e., encloses on all sides) a second material in at least one reference plane.

The term "colorant" as used herein refers to a component that imparts color, including for instance, a pigment, a dye, and combinations thereof. The term "pigment" as used herein refers to a material loaded above its solubility resulting in non-dissolved (or non-dissolvable) particles.

The terms "bi-layer" or "bilayer" as used herein refer to a thin film comprising a first layer of a first material and a second layer of a second material. As described herein, in some embodiments the first layer is adjacent and in contact with the second layer. In some embodiments, the first layer is in substantially uninterrupted contact with the second layer.

The phrase "in planar contact" or "planarly contacting" is used to indicate that one layer or layered structure is contacting (and disposed either above or below) another layer or layered structure. Such contact is facial contact, rather than edge contact.

The terms "high refractive index" and "low refractive index" are relative terms and used when two layers are compared in both in-plane directions of interest. The layer that has greater in-plane average refractive index is the high refractive index layer, whereas the layer that has lower in-plane average refractive index is the low refractive index layer.

The terms "high entrance angle" and "low entrance angle" are relative terms. In some embodiments, high entrance angles are angles equal to or greater than about 30 degrees (e.g., 40, 50, 60 degrees). In some embodiments, low entrance angles are angles lower than 30 degrees (e.g., 25, 20, 15, 4, 2 degrees).

The terms "high observation angle" and "low observation angle" are relative terms. In some embodiments, high observation angles are angles equal to or greater than about 1 degree (e.g., 1, 2, 4 degrees). In some embodiments, low observation angles are angles lower than 1 degree (e.g., 0.8, 0.5, 0.2 degree).

The term "optical association" with reference to a layer and optical elements (e.g., cube corner elements) means that the layer is positioned relative to the optical elements such that a significant portion of light transmitted through the optical elements can strike the layer and be reflected back into the optical elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The disclosure presented herein provides a solution to the problem of attempting to achieve colored (or other wavelength-selective) retroreflection without exposing the color to environmental challenges. It has been discovered that a conformal wavelength-selective radiation absorbing coating layer adjacent to the structured surface of a retroreflective article can protect the colorant (or other wavelength-selective material) by locating it on the cube side of the sheeting. Surprisingly, the coating layer can impart color and still allows for significant retroreflected brightness.

In the embodiments of the present disclosure, with the colorant (or other wavelength-selective material) located on the cube side of the sheeting, light stabilizers can be loaded into the sheeting itself and/or into a non-colored top-coat. In addition to protecting the colorant (or other wavelength-selective material) from environmental challenges, this configuration also provides protection against mechanical and chemical challenges. For example, in the traffic signage supply chain, it is common for a converter or customer to print onto the retroreflective sheeting. In this case, the print shops often will make errors in printing and will clean the ink off the sheeting with an organic solvent wipe. Customers have observed that the solvent will partially dissolve the pigmented top coats. With colorant (or other wavelength-selective material) on the backside of the prisms, it is protected from the organic solvent wiping.

The approach taken to deposit the conformal wavelength-selective radiation absorbing coating of the present disclosure was the layer-by-layer (LbL) self-assembly coating method, which is a "bottom-up" coating technique that allows precise control of coating thickness on the nanoscale, VOC (volatile organic compound)-free coating from aqueous solutions under ambient conditions (non-vacuum), and conformal coating of non-planar substrates with a wide material set including both polymers and nanoparticles. This LbL process is commonly used to assemble thin films or coatings of oppositely charged polyelectrolytes electrostatically, but other functionalities such as hydrogen bond donor/acceptors, metal ions/ligands, and covalent bonding moieties can also be the driving force for film assembly. Typically, this deposition process involves exposing the substrate having a surface charge, to a series of liquid solutions. This can be accomplished by immersion of the substrate into liquid baths (also referred to as dip coating), spraying, spin coating, roll coating, inkjet printing, and the like. Exposure to the first polyion liquid solution, in which the polyion has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. The substrate is then exposed to one or more water rinse steps to remove any physically entangled or loosely bound polyelectrolyte. Following the rinse, the substrate is then exposed to a second polyion liquid solution, in which the polyion has charge opposite that of the first polyion. Once again, adsorption occurs, since the surface charge of the substrate is opposite that of the polyion in the second liquid solution. Continued exposure to the second polyion liquid solution then results in a reversal of the surface charge of the substrate. A subsequent rinsing can be performed to complete the cycle. This sequence of steps is said to build up one layer pair, also referred to as a "bi-layer" of deposition and can be repeated as desired to add further layer pairs to the substrate. A polycation layer can comprise polycationic polymers or nanoparticles. Similarly, a polyanion layer can comprise polyanionic polymers or nanoparticles. The LbL coating method has previously been disclosed for use in retroreflective articles. In WO2016/39820 (McCoy et al.), LbL coating was used to deposit partially transmissive, dielectric mirrors for beaded retroreflectors.

Traditionally, coating onto the structures of a retroreflective sheeting with a non-reflective composition will significantly reduce reflected brightness by disrupting total internal reflection (TIR). In this case, however, the coating is sufficiently thin and conformal to still allow TIR, but unexpectedly thick enough to impart significant color to the retroreflective article.

In a first aspect, the present disclosure provides a retroreflective article. The retroreflective article comprises: a retroreflective layer comprising a plurality of cube corner elements that collectively form a structured surface that is opposite a major surface; and a conformal wavelength-selective radiation absorbing coating layer adjacent to the structured surface.

In a second aspect, a method is provided. The method of making a retroreflective article comprises: obtaining a retroreflective layer comprising a plurality of cube corner elements that collectively form a structured surface opposite a major surface; and forming a conformal wavelength-selective radiation absorbing coating layer by applying a first material having a first binding group to the structured surface, and applying a second material having a second binding group to the first material; wherein the conformal wavelength-selective radiation absorbing coating layer absorbs radiation of at least one selected wavelength.

The below disclosure relates to both the first aspect and the second aspect.

Figure 1:
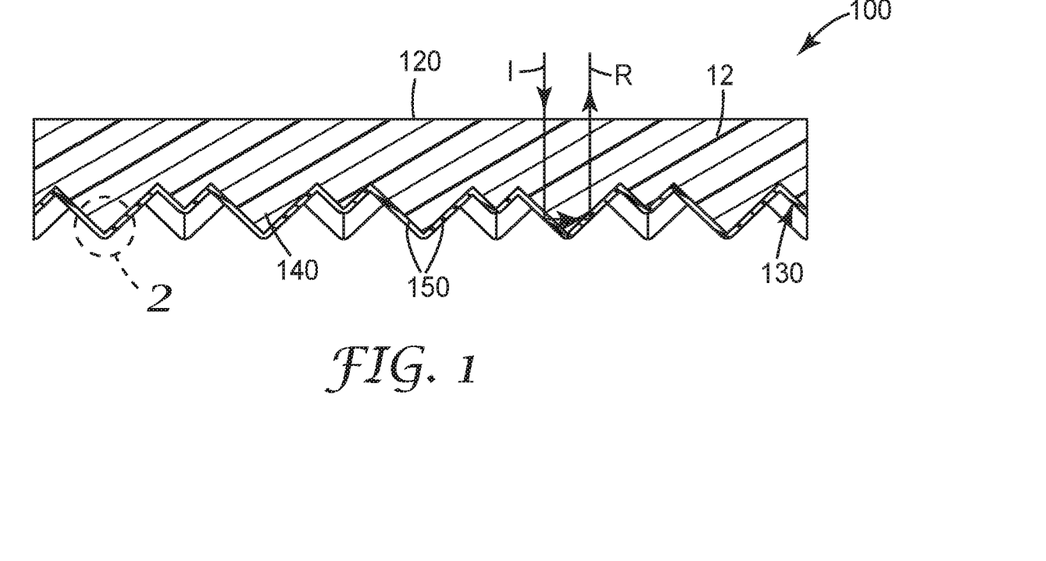
FIG. 1 is a cross-sectional side view of an exemplary embodiment of a retroreflective article according to the present application.

FIG. 1 is a schematic cross-sectional side view of an exemplary retroreflective article 100 according to the present application. The retroreflective article 100 has a first major surface 120 and a second major surface 130, opposite the first major surface 120. In some embodiments, the first major surface 120 is generally flat and is designated as the front surface of the article. The second major surface 130 is structured and comprises a plurality of cube corner elements 140. A conformal wavelength-selective radiation absorbing coating layer 150 is adjacent cube corner elements 140. In some embodiments, an intervening element may be present between conformal coating layer 150 and cube corner elements 140 such that the conformal coating layer 150 and cube corner elements 140 are not "directly" adjacent. In some embodiments, the intervening element may include a surface treatment such as a corona treatment or a primer. Typically, the conformal wavelength-selective radiation absorbing coating layer 150 is in optical association with the cube corner elements 140.

In many embodiments, the conformal wavelength-selective radiation absorbing coating layer comprises a first material and a second material. Typically, at least one of the first material or the second material is applied by layer-by-layer self-assembly. Conformal coating layers according to the present application can include 1, 5, 10, 15, 20, or up to 100 bi-layers applied by layer-by-layer self-assembly, although the individual bi-layers of the conformal wavelength-selective radiation absorbing coating layer in the final article may not be detectable by imaging methods such as scanning electron microscopy (SEM) and transmission electron microscopy (TEM).

Figure 2:
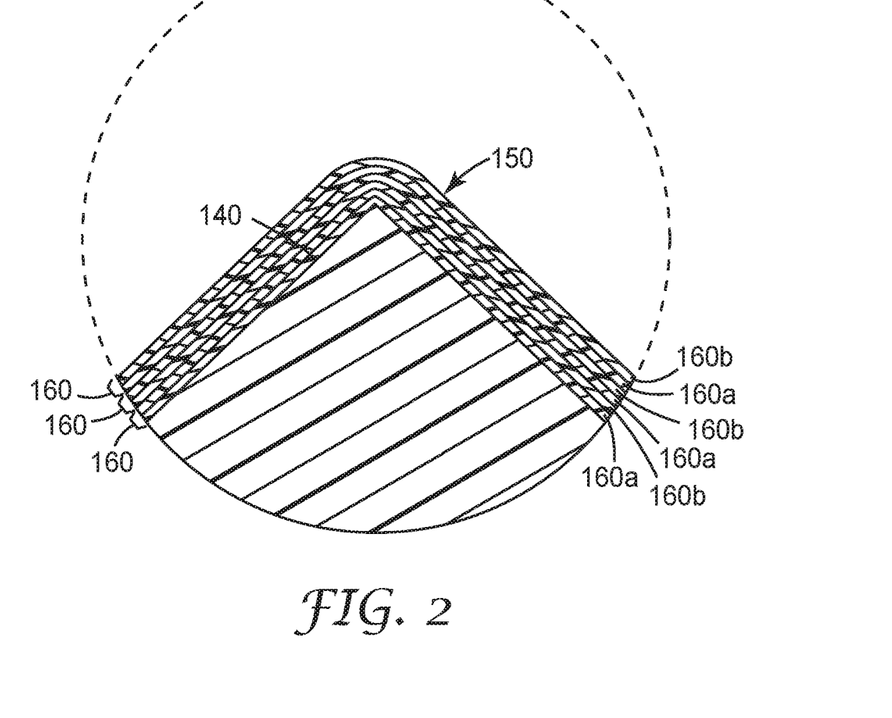
FIG. 2 is a close-up view of the retroreflective article of FIG. 1, taken of the portion enclosed in the circle labeled "2" in FIG. 1.

FIG. 2 is a schematic close-up view of the retroreflective article of FIG. 1, taken of the portion enclosed in the circle labeled "2" in FIG. 1. The conformal wavelength-selective radiation absorbing coating layer 150 follows the contour of cube corner elements 140 and includes a stack of three bi-layers 160. Each bi-layer 160 includes a first layer 160a and a second layer 160b. In some embodiments, the first layer 160a comprises a material having a first bonding group (e.g., a polycation) and the second layer 160b comprises a material having a second bonding group (e.g., a polyanion). While the conformal coating layer 150 shown in FIG. 1 depicts three bi-layers 160 for simplicity, it is within the scope of the present application to provide conformal coating layers having a plurality of bi-layers. Further, as noted above, FIG. 2 is schematic because even though the conformal wavelength-selective radiation absorbing coating layer is often formed using layer-by-layer self-assembly, it may not be possible to observe distinct bi-layers of the resulting article using imaging methods.

In some embodiments, the first material comprises a first binding group and the second material comprises a second binding group, and the first binding group and the second binding group have complementary interactions. The complementary interactions are usually complementary electrostatic interactions or complementary hydrogen bonding interactions between hydrogen bond donors and hydrogen bond acceptors. Polymers, nanoparticles, and small molecules can be referred to as "polyionic" or "polyion" or, specifically, "polyanionic", "polyanion", "polycation" or "polycationic," if they contain a plurality of negative or positive ionic charged sites, respectively. Examples of polyelectrolytes and nanoparticles are described in greater detail below.

In some embodiments, at least one of the first material or the second material comprises a polyelectrolyte. For instance, in certain embodiments the first material comprises a polyelectrolyte and the second material comprises nanoparticles. In some embodiments, the first material comprises a polyanion and the second material comprises a polycation, whereas in other embodiments the first material comprises a polycation and the second material comprises a polyanion. In some embodiments, the polyelectrolyte is a polycation. When the first material is a polycation, the first material typically contacts the cube corner elements.

In some embodiments, the polycation is a polycationic polymer. Suitable polycationic polymers can include, but are not limited to, polydiallyldimethylammonium chloride (PDAC), linear and branched poly(ethylenimine) (PEI), poly(allylamine hydrochloride) (PAH), polyvinylamine, chitosan, polyaniline, polyamidoamine, poly(vinylbenzyltrimethylamine), and members of the polyquaternium group. In some embodiments, the polyelectrolyte is a polyanionic polymer. Suitable polyanionic polymers include, but are not limited to, sulfonated polystyrene (PSS), poly(vinyl sulfate), poly(vinyl sulfonate), poly(acrylic acid), poly(methacrylic acid), dextran sulfate, heparin, hyaluronic acid, carrageenan, carboxymethylcellulose (CMC), alginate, sulfonated tetrafluoroethylene based fluoropolymers such as NAFION, poly(vinylphosphoric acid), poly(vinylphosphonic acid), and sodium hexametaphosphate. In some embodiments, the polycation is selected from the group consisting of polydiallyldimethylammonium chloride, polyethylenimine, polyallylamine, poly(2-(trimethylamino)ethyl methacrylate, and copolymers thereof.

When the conformal wavelength-selective radiation absorbing coating layer comprises a first material and a second material, one of the first material or the second material comprises at least one wavelength-selective radiation absorbing material. For instance, one of the first material or the second material comprises a) a pigment functionalized with a first binding group or a second binding group; b) a dye comprising at least one functional group selected from sulfonate, carboxylate, phosphonate, amine, ammonium, sulfonium, phosphonium, or combinations thereof; or c) combinations of a) and b). Any number of one or more pigments and dyes may be combined to provide a particular color in the article.

In some embodiments, suitable dyes include for instance and without limitation, Chlorophenol Red, Acid Orange 12, Acid Blue 25, Eriochrome Black T, Lissamine Green B, Acid Fuchsin, Alizarin Blue Black B, Acid Blue 80, Acid Blue 9, Brilliant Blue G, Water Soluble Nigrosin, Methylene Blue, Crystal Violet, Safranin, Basic Fuchsin, and combinations thereof. Either a single dye or a mixture of two or more dyes can be used to achieve a desired color. One method of incorporating the dye into the conformal wavelength-selective radiation absorbing coating layer is to soak the coating layer in a dilute aqueous solution of the dye(s), rinse, and dry. In this method, the dye(s) ion exchange into the coating. In other embodiments, one or more dyes may be incorporated directly in a solution of the first material, a solution of the second material, or in both.

In some embodiments, suitable pigments include ionically surface-modified pigment nanoparticles commercially available as inkjet pigment colorants under the trade designation CAB-O-JET from Cabot Corporation (Boston, MA), such as black, cyan, magenta, and/or yellow pigments. In general, pigments or other wavelength-selective absorbing particles may be functionalized either by being covalently surface modified or non-covalently surface modified, for example, with an ionic surfactant.

In some embodiments, suitable near infrared wavelength absorbing materials include IR absorbing dyes, IR absorbing pigments such as nanoparticles of lanthanum hexaboride ($LaB_6$) and doped metal oxides including antimony-doped tin oxide (ATO), indium-doped tin oxide (ITO), mixed valent tungsten oxides such as cesium tungsten oxide (CWO), and the combination thereof.

Suitable nanoparticles of the conformal wavelength-selective radiation absorbing coating layer can have an average primary or agglomerate particle size diameter of between 5 nanometers (nm) and 300 nm. The average particle size of the nanoparticles of the dried conformal wavelength-selective radiation absorbing coating layer can be measured using transmission electron microscopy or scanning electron microscopy, for example. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components.

The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e., at least 50%) are present as discrete unagglomerated nanoparticles in the coating suspensions. For example, in some embodiments, at least 70%, 80% or 90% of the nanoparticles can be present as discrete unagglomerated nanoparticles.

In some embodiments the nanoparticles (e.g., pigments) have a relatively small average particle size. For example, in some embodiments, the average primary or agglomerate particle size can be 5 nm or greater, 10 nm or greater, 15 nm or greater, 25 nm or greater, 40 nm or greater, 50 nm or greater, or 75 nm or greater; and 300 nm or smaller, 250 nm or smaller, 200 nm or smaller, 150 nm or smaller, or 100 nm or smaller.

The concentration of nanoparticles can be at least 30 wt. % of the dried conformal wavelength-selective radiation absorbing coating layer. In some embodiments, the concentration of nanoparticles can be no greater than 80 wt. %, no greater than 85 wt. %, no greater than 90 wt. %, or no greater than 95 wt. %. The concentration of nanoparticles can be determined by methods known in the art, such as thermogravimetric analysis. In some embodiments, the dried conformal wavelength-selective radiation absorbing coating layer can include 30 wt. % or more nanoparticles, 40 wt. % or more, 50 wt. % or more, 55 wt. % or more, 60 wt. % or more, 65 wt. % or more, or 70 wt. % or more (e.g., pigment) nanoparticles to impart a desired color to the retroreflective article.

In many embodiments, the (dried) conformal wavelength-selective radiation absorbing coating layer has a thickness of 10 nanometers (nm) or greater, 15 nm or greater, 20 nm or greater, 25 nm or greater, 30 nm or greater, 35 nm or greater, 40 nm or greater, 45 nm or greater, or 50 nm or greater; and 2 micrometers or less, 1.5 micrometers or less, 1 micrometer or less, 900 nm or less, 750 nm or less, 600 nm or less, 500 nm or less, 400 nm or less, 350 nm or less, 300 nm or less, 250 nm or less, 200 nm or less, 150 nm or less, 100 nm or less, or 75 nm or less. Stated another way, the dried conformal wavelength-selective radiation absorbing coating layer may have a thickness between 10 nm and 400 nm, between 10 nm and 200 nm, or between 50 nm and 150 nm.

Figure 3:
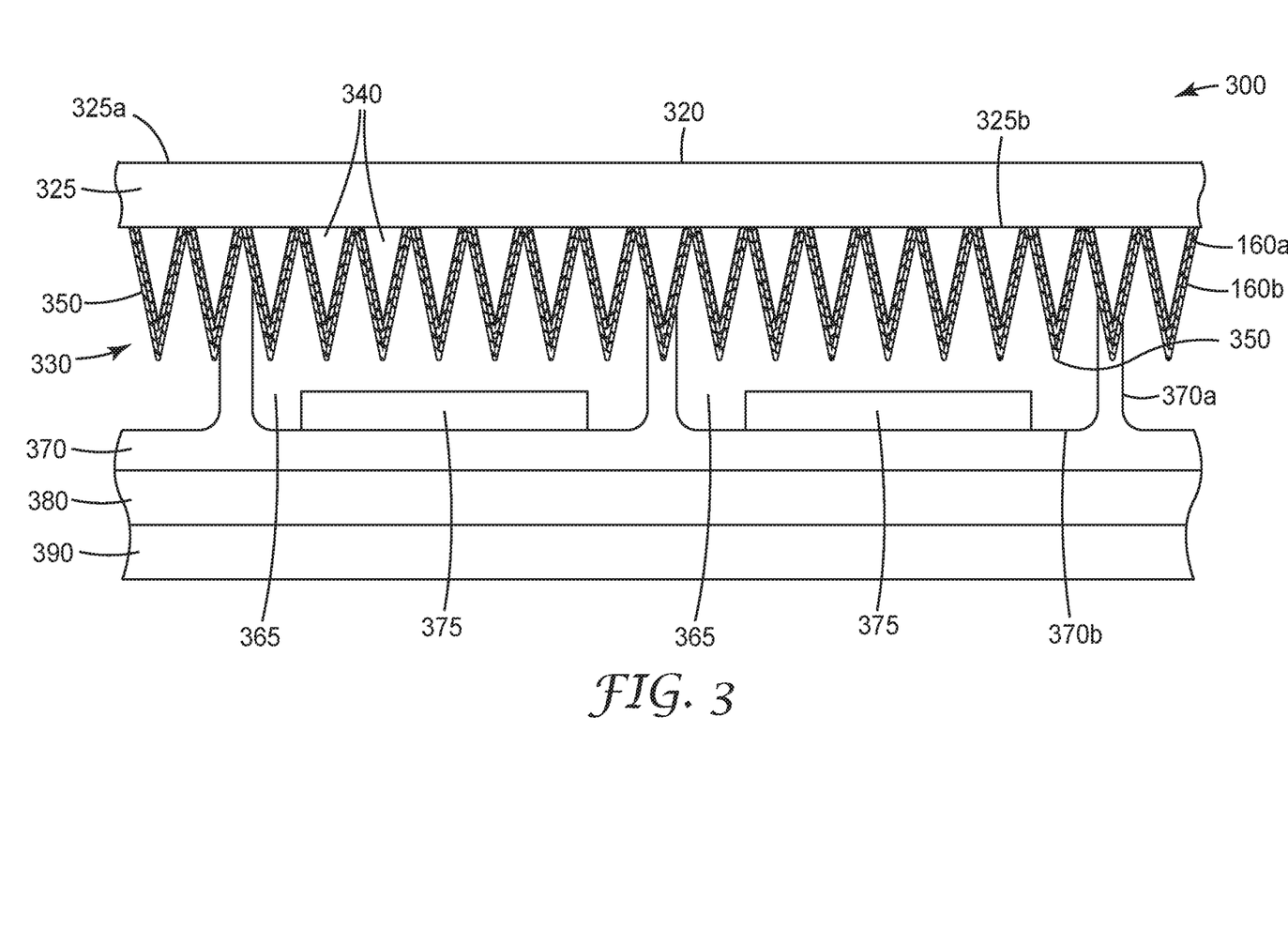
FIG. 3 is a cross-sectional side view of another exemplary embodiment of a retroreflective article according to the present application.

FIG. 3 is a schematic cross-sectional side view of another exemplary retroreflective article 300 according to the present application. The retroreflective article 300 has a first major surface 320 and a second major surface 330, opposite the first major surface 320. The first major surface 320 comprises a body layer 325 having a first side 325a and a second side 325b. The second major surface 330 is structured and comprises a plurality of cube corner elements 340 disposed on the second side of the body layer 325b. A conformal wavelength-selective radiation absorbing coating layer 350 is disposed on at least some of cube corner elements 340. This conformal layer 350 is depicted comprising a plurality of bi-layers, each bi-layer comprising a first layer 160a and a second layer 160b. A sealing layer 370 having a first region 370a and a second region 370b is also shown adjacent to the conformal wavelength-selective radiation absorbing coating layer 350.

The first region 370a is raised relative to the second region 370b, and the first region 370a contacts at least a portion of the conformal wavelength-selective radiation absorbing coating layer 350. In some embodiments, the first region 370a surrounds the second region 370b. Optionally, the second region 370b corresponds to a cell having a cell size, such as less than 1000 microns. The sealing layer 370 enables formation of a low refractive index area 365 (e.g., air gap or other low refractive index material) between the sealing layer 370 and the conformal wavelength-selective radiation absorbing coating layer 350. In some embodiments, the sealing layer 370 may further comprise one or more barrier elements 375. In other embodiments, the sealing layer 370 does not include barrier elements (not shown). While the sealing layer 370 is shown as a unitary construction, a multi-layer sealing layer may also be used and is within the scope of the present application. The retroreflective article 300 further optionally includes an adhesive layer 380 and a release layer 390.

Figure 4:
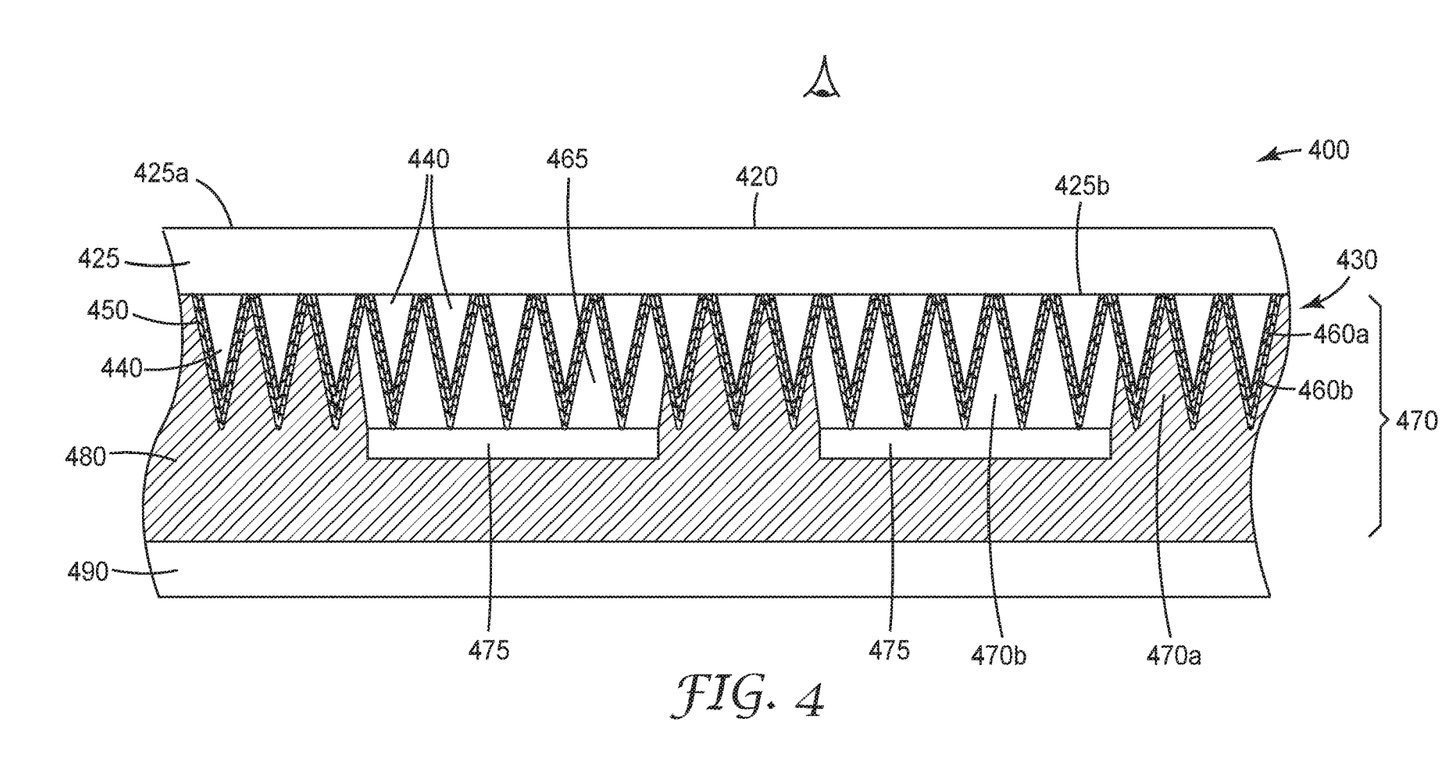
FIG. 4 is a cross-sectional side view of another exemplary embodiment of a retroreflective article according to the present application.

FIG. 4 is a schematic cross-sectional side view of a further exemplary retroreflective article 400 according to the present application. The retroreflective article 400 has a first major surface 420 and a second major surface 430, opposite the first major surface 420. The first major surface 420 comprises a body layer 425 having a first side 425a and a second side 425b. The second major surface 430 is structured and comprises a plurality of cube corner elements 440 disposed on the second side of the body layer 425b. A conformal wavelength-selective radiation absorbing coating layer 450 is disposed on cube corner elements 440. This conformal layer 450 is depicted comprising a plurality of bi-layers having a first layer 460a and a second layer 460b. The sealing layer 470 enables formation of a low refractive index area 465 and includes a first region 470a and a second region 470b. The first region 470a contacts at least a portion of the conformal wavelength-selective radiation absorbing coating layer 450 and in some embodiments, the first region 470a includes an adhesive 480. In some embodiments, the adhesive 480 is one of a pressure-sensitive adhesive and a hot-melt adhesive. The second region 470b includes a low refractive index layer (e.g., air gap or other low refractive index material) and barrier elements 475. The retroreflective article 400 further includes a release liner 490 adjacent the adhesive 480.

The retroreflective articles of FIGS. 3 and 4 include a body layer. The term "body layer" typically refers to a material to which cube corner elements are attached or adjacent. In some embodiments, the body layer has a thickness of between about 20 µm and about 2500 µm. In some embodiments, the body layer has a thickness of between about 20 µm and about 1000 µm. In some embodiments, the body layer is a different material(s) than the discrete truncated cube corner elements. In some embodiments, the body layer includes one or more light transmitting or transparent polymeric materials. In some embodiments, the body layer may itself include more than one layer. In some embodiments where the body layer includes multiple layers, these layers can include more than one composition, and the composition can vary by layer. In some embodiments, the body layer is integral with the cube corner elements and has the same composition as the cube corner elements as shown in FIG. 1. In these embodiments, the body layer is sometimes referred to as a land layer.

Some exemplary body layers are described in, for example, U.S. Pat. No. 7,611,251 (Thakkar et al.), incorporated by reference herein in its entirety. Exemplary materials for use in the body layer include, for example, polyethylene, polypropylene, PET (polyethylene terephthalate), PTFE (polytetrafluoroethylene), PVC (polyvinyl chloride), and nylon. In some embodiments, the body layer includes a polyolefin. In some embodiments, the body layer includes at least 50 weight percent (wt. %) of alkylene units having 2 to 8 carbon atoms (e.g., ethylene and propylene). In some embodiments, the body layer includes a biaxially oriented polymer. In some embodiments, the body layer includes one or more UV absorbers (also referred to as "UVAs"). UVAs are used in retroreflective articles to, for example, protect films containing optical layers from the harmful radiation of the sun in the solar light spectrum (between about 290 nm and 400 nm). Some exemplary UVA materials are described in, for example, U.S. Pat. No. 5,450,235 (Smith et al.) and PCT Publication No. 2012/135595 (Meitz et al.), both of which are incorporated in their entirety herein.

In some embodiments, the cube corner elements in the present disclosure are truncated cube corner elements. In some embodiments, the discrete truncated cube corner elements have a height of between about 1.8 mils and about 2.5 mils. The truncated cube corner elements can include any desired materials, including those described in, for example, U.S. Pat. No. 3,712,706 (Stamm) or U.S. Pat. No. 4,588,258 (Hoopman), both of which are incorporated herein by reference in their entirety. Some exemplary materials for use in the truncated cube corner elements include, for example, thermoplastic polymers or polymerizable resins. Exemplary thermoplastic polymers include polycarbonate. Exemplary polymerizable resins suitable for forming the array of cube corner elements may be blends of photoinitiator and at least one compound bearing an acrylate group. In some embodiments, the resin blend contains a monofunctional, a difunctional, or a polyfunctional compound to ensure formation of a crosslinked polymeric network upon irradiation.

Illustrative examples of resins that are capable of being polymerized by a free radical mechanism that can be used in the embodiments described herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term "acrylate" is used herein to encompass both acrylates and methacrylates. U.S. Pat. No. 4,576,850 (Martens) discloses examples of crosslinked resins that may be used in cube corner element arrays of the present disclosure. Polymerizable resins of the type disclosed in, for example, U.S. Pat. No. 7,611,251 (Thakkar) may be used in cube corner element arrays of the present disclosure.

The truncated cube corner elements can be composite cube corner elements, as described in, for example, PCT Publication No. WO 2012/166460 (Benson et al.), incorporated in its entirety herein. Composite truncated cube corner elements include a first resin in a first region of a cube corner element and a second resin in a second region in that cube corner element. Whichever of the first or second resin is directly adjacent to the polymeric layer can be the same or different than the polymeric layer. The plurality of cube corner elements can also be any other type of cube corner element plurality described in PCT Publication No. WO 2012/166460.

In some embodiments, a separate overlay film is provided on the viewing surface of the retroreflective article (not shown). The overlay film can assist in providing improved (e.g., outdoor) durability or to provide an image receptive surface. Indicative of such outdoor durability is maintaining sufficient brightness specifications such as called out in ASTM D49560-1a after extended durations of weathering (e.g., 1 year, 3 years). In some embodiments, the cap-Y whiteness is greater than 15 before and after weathering (e.g., 1 year, 3 years).

One or more sealing layers (also referred to, in the singular, as seal film or sealing film or seal layer) may be used on the retroreflective articles of the present application. The sealing layer(s) can include any of the materials mentioned in, for example, U.S. Pat. No. 4,025,159 (McGrath), U.S. Pat. No. 7,611,251 (Thakkar et al.), and U.S. Patent Application Publication No. 2013/114143 (Thakkar et al.) all of which are incorporated by reference in their entirety. In some embodiments, a sealing layer is structured, as described in, for example, U.S. Patent Application Publication No. 2016/0139306 (Chatterjee et al.), which is incorporated by reference herein in its entirety.

Some embodiments include a plurality of individual seal legs that extend between the discrete truncated cube corner elements and a multilayer sealing layer. In some embodiments, these seal legs form one or more cells, for instance having a cell size of less than 1000 microns. A low refractive index material (e.g., a gas, air, aerogel, or an ultra-low index material described in, for example, U.S. Patent Application Publication No. 2010/0265584 (Coggio et al.)) can be enclosed in each cell. The presence of the low refractive index material creates a refractive index differential between the discrete truncated cube corner elements and the low refractive index material. This permits total internal reflection at the surfaces of the discrete truncated cube corner elements. In embodiments where air is used as the low refractive index material, the interface between the air and the discrete truncated cube corner elements is often referred to as an air interface.

In some embodiments, the sealing layer is a multilayer film that includes the layers described in, for example, PCT Publication WO 2011/091132 (Dennison et al.), the disclosure of which is incorporated herein by reference in its entirety.

In some embodiments, the sealing layer further comprises a barrier layer, as described in, for example, in U.S. Patent Application Publication No. 2013/0034682 (Free et al.), incorporated herein by reference in its entirety. In these embodiments, the retroreflective sheeting comprises optically active areas in which incident light is retroreflected by a structured surface including, for example, cube corner elements, and one or more optically inactive areas in which incident light is not substantially retroreflected by the structured surface. The one or more optically active areas include a low refractive index layer or material adjacent to a portion of the structured surface. The one or more optically inactive areas include an adhesive material adjacent to a portion of the structured surface. The adhesive material substantially destroys retroreflectivity of the portions of the structured surface that are directly adjacent thereto. Barrier layers are disposed between the adhesive material and the low refractive index layer. The barrier layer has sufficient structural integrity to substantially prevent flow of the adhesive material into the low refractive index layer. Exemplary materials for the barrier layer include resins, polymeric materials, inks, dyes, and vinyls. In some embodiments, the barrier layer traps a low refractive index material in the low refractive index layer. Low refractive index materials are materials that have an index of refraction that is less than 1.3 (e.g., air and low index materials (e.g., low refractive index materials described in U.S. Patent Application Publication No. 2012/0038984 (Patel et al.), which is hereby incorporated herein in its entirety)). In some embodiments, the adhesive material is a pressure sensitive adhesive. In some embodiments, the retroreflective article includes a pressure sensitive adhesive layer that contacts at least some of the discrete truncated cube corner elements. The pressure sensitive adhesive layer comprises at least one discrete barrier layer. In some embodiments, the pressure sensitive adhesive comprises a plurality of discrete barrier layers. In other embodiments, the adhesive material is a hot-melt adhesive.

In certain embodiments, the retroreflective article further comprises a radiation reflecting layer adjacent to (e.g., in optical association with) the conformal wavelength-selective radiation absorbing coating layer. The radiation reflecting layer can be a metallic layer, a dielectric layer, or a combination thereof. The metallic layer is typically formed by vapor coating a metallic layer on the conformal wavelength-selective radiation absorbing coating layer, such as a metal vapor comprising (or consisting of) aluminum or silver. The dielectric layer can be applied in a multilayer reflective coating process, such as described in U.S. Pat. No. 6,172,810, and a layer-by-layer process, such as described in PCT Publication No. WO 2016/039820 (McCoy et al.), incorporated by reference herein in its entirety.

Figure 5:
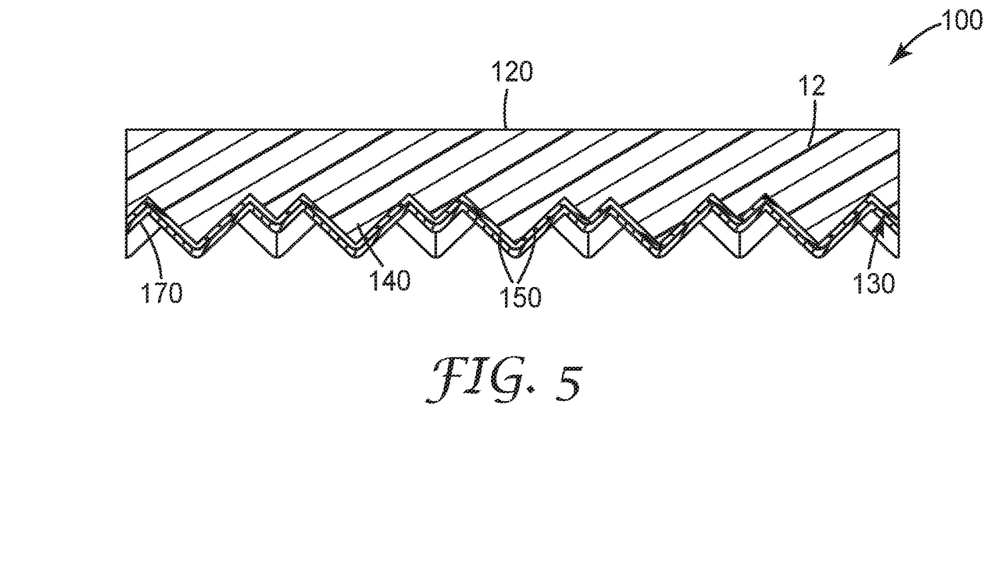
FIG. 5 is a cross-sectional side view of another exemplary embodiment of a retroreflective article according to the present application.

FIG. 5 is a schematic cross-sectional side view of an exemplary retroreflective article 100 according to the present application comprising a radiation reflecting layer 170 that is conformal to an adjacent wavelength-selective radiation absorbing conformal coating layer 150. As in FIG. 1, the retroreflective article 100 has a first major surface 120 and a second major surface 130, opposite the first major surface 120. In some embodiments, the first major surface 120 is generally flat and is designated as the front surface of the article. The second major surface 130 is structured and comprises a plurality of cube corner elements 140. The conformal wavelength-selective radiation absorbing coating layer 150 is adjacent cube corner elements 140.

In some embodiments, an intervening element may be present between the conformal coating layer 150 and cube corner elements 140, or between the conformal coating layer 150 and the radiation reflecting layer 170. In some embodiments, the intervening element may include a surface treatment such as a corona treatment or a primer.

Optionally, both of a metallic layer and a dielectric mirror may be used in discrete (either continuous or discontinuous) segments disposed in the same plane (not shown), similar to the configuration of first and second segments described in the retroreflective articles of U.S. Application Publication No. 2017/0192142 (Niwas et al.), incorporated by reference herein in its entirety.

To impart wavelength selectivity to the retroreflective article, a suitable wavelength-selective radiation absorbing coating layer absorbs at least one wavelength between 350 nm and 10,600 nm, for instance at least one wavelength of 350 nm or greater, 400 nm or greater, 450 nm or greater, 500 nm or greater, 550 nm or greater, 600 nm or greater, 650 nm or greater, or 700 nm or greater; and at least one wavelength of 10,600 nm or less, 10,000 nm or less, 9,000 nm or less, 8,000 nm or less, 7,000 nm or less, 6,000 nm or less, 5,000 nm or less, 4,000 nm or less, 3,000 nm or less, 2,000 nm or less, 1,700 nm or less, 1,400 nm or less, 1,000 nm or less, 900 nm or less, 850 nm or less, 800 nm or less, or 750 nm or less. Stated another way, the conformal wavelength-selective radiation absorbing coating layer may absorb at least one wavelength between 350 nm and 10,600 nm, between 350 nm and 1400 nm, between 350 nm and 750 nm (e.g., a typical visible light wavelength range), or between 750 nm and 1400 nm (e.g., a typical near infrared light wavelength range).

Regardless of which method and/or constructions are used to make the retroreflective articles, the articles of the present application have certain unique optical features. One way of measuring these unique optical features of the retroreflective articles of the present application involves measuring the coefficient of retroreflection (also referred to herein as retroreflectivity or brightness), $R_A$, which can be measured according to US Federal Test Method Standard 370 at −4° entrance, 0° orientation, and at various observation angles. $R_A$ is typically measured at discrete observation angles and averaged over the annular region between two adjacent measured observation angles. $R_A$ is expressed in units of candelas per lux per square meter (Cd/lux/m$^2$). In some embodiments, the retroreflective article exhibits a coefficient of retroreflection ($R_A$) of 35 candela/lux/m$^2$ (Cd/lux/m$^2$) or greater at an observation angle of 0.2 degrees and an entrance angle of +5 degrees. In certain embodiments, the retroreflective article exhibits a coefficient of retroreflection ($R_A$) of 8 Cd/lux/m$^2$ or greater at an observation angle of 1.5 degrees and an entrance angle of +5 degrees.

SELECT EMBODIMENTS OF THE DISCLOSURE

Embodiment 1 is a retroreflective article. The retroreflective article includes a retroreflective layer including a plurality of cube corner elements that collectively form a structured surface that is opposite a major surface; and a conformal wavelength-selective radiation absorbing coating layer adjacent to the structured surface.

Embodiment 2 is the retroreflective article of embodiment 1, wherein the conformal wavelength-selective radiation absorbing coating layer includes a first material and a second material.

Embodiment 3 is the retroreflective article of embodiment 2, wherein the first material includes a first binding group and the second material includes a second binding group, and wherein the first binding group and the second binding group have complementary interactions.

Embodiment 4 is the retroreflective article of embodiment 3, wherein the complementary interactions are complementary electrostatic interactions.

Embodiment 5 is the retroreflective article of any of embodiments 2-4, wherein at least one of the first material or the second material includes a polyelectrolyte.

Embodiment 6 is the retroreflective article of any of embodiments 2-5, wherein the first material includes a polyelectrolyte and the second material includes nanoparticles.

Embodiment 7 is the retroreflective article of any of embodiments 2-6, wherein the first material includes a polycation and the second material includes a polyanion.

Embodiment 8 is the retroreflective article of embodiment 7, wherein the polycation is selected from the group consisting of polydiallyldimethylammonium chloride, polyethylenimine, polyallylamine, poly(2-(trimethylamino)ethyl methacrylate, and copolymers thereof.

Embodiment 9 is the retroreflective article of any of embodiments 2-7, wherein one of the first material or the second material includes at least one wavelength-selective radiation absorbing material.

Embodiment 10 is the retroreflective article of any of embodiments 2-8, wherein one of the first material or the second material includes a) a pigment functionalized with the first binding group or the second binding group; b) a dye including at least one functional group selected from sulfonate, carboxylate, phosphonate, amine, ammonium, sulfonium, phosphonium, or combinations thereof; or c) combinations of a) and b).

Embodiment 11 is the retroreflective article of any of the preceding embodiments, wherein the conformal wavelength-selective radiation absorbing coating layer has a thickness between 10 nanometers (nm) and 2 micrometers.

Embodiment 12 is the retroreflective article of embodiment 11, wherein the thickness is between 10 nm and 400 nm.

Embodiment 13 is the retroreflective article of embodiment 11 or embodiment 12, wherein the thickness is between 50 nm and 150 nm.

Embodiment 14 is the retroreflective article of embodiment 2, wherein the first material is a polycation and the first material contacts the cube corner elements.

Embodiment 15 is the retroreflective article of any of the preceding embodiments, further including a sealing layer adjacent to the conformal wavelength-selective radiation absorbing coating layer; and a low refractive index layer between the sealing layer and the conformal wavelength-selective radiation absorbing coating layer.

Embodiment 16 is the retroreflective article of embodiment 15, wherein the sealing layer further includes a first region in contact with the conformal wavelength-selective radiation absorbing coating layer and a second region, and wherein the first region surrounds the second region.

Embodiment 17 is the retroreflective article of embodiment 16, wherein the second region of the sealing layer includes at least one barrier layer.

Embodiment 18 is the retroreflective article of any of embodiments 15-17, wherein the low refractive index layer includes one of a low refractive index material or air.

Embodiment 19 is the retroreflective article of any of embodiments 15-18, wherein the sealing layer includes one of a pressure sensitive adhesive or a hot-melt adhesive.

Embodiment 20 is the retroreflective article of embodiment 16 or embodiment 17, wherein the first region is raised relative to the second region.

Embodiment 21 is the retroreflective article of any of embodiments 16, 17, or 20, wherein the second region corresponds to a cell having a cell size.

Embodiment 22 is the retroreflective article of embodiment 21, wherein the cell size is less than 1000 microns.

Embodiment 23 is the retroreflective article of any of embodiments 1-14, further including a radiation reflective layer including a metallic layer, a dielectric layer, or a combination thereof, adjacent to the conformal wavelength-selective radiation absorbing coating layer.

Embodiment 24 is the retroreflective article of embodiment 23, wherein the metallic layer includes a metal vapor coated on the conformal wavelength-selective radiation absorbing coating layer.

Embodiment 25 is the retroreflective article of embodiment 22 or embodiment 23, wherein the metallic layer includes aluminum or silver.

Embodiment 26 is the retroreflective article of any of the preceding embodiments, wherein the conformal wavelength-selective radiation absorbing coating layer absorbs at least one wavelength between 350 nm and 10,600 nm.

Embodiment 27 is the retroreflective article of any of the preceding embodiments, wherein the conformal wavelength-selective radiation absorbing coating layer absorbs at least one wavelength between 350 nm and 1400 nm.

Embodiment 28 is the retroreflective article of any of embodiments 1-27, wherein the conformal wavelength-selective radiation absorbing coating layer absorbs at least one wavelength between 350 nm and 750 nm.

Embodiment 29 is the retroreflective article of any of embodiments 1-27, wherein the conformal wavelength-selective radiation absorbing coating layer absorbs at least one wavelength between 750 nm and 1400 nm.

Embodiment 30 is the retroreflective article of any of the preceding embodiments, wherein the conformal wavelength-selective radiation absorbing coating layer includes nanoparticles having an average particle size of between 5 nm and 300 nm.

Embodiment 31 is the retroreflective article of any of the preceding embodiments, exhibiting a coefficient of retroreflection ($R_A$) of 35 candela/lux/m$^2$ (Cd/lux/m$^2$) or greater at an observation angle of 0.2 degrees and an entrance angle of +5 degrees.

Embodiment 32 is the retroreflective article of any of the preceding embodiments, exhibiting a coefficient of retroreflection ($R_A$) of 8 Cd/lux/m$^2$ or greater at an observation angle of 1.5 degrees and an entrance angle of +5 degrees.

Embodiment 33 is the retroreflective article of any of the preceding embodiments, wherein the conformal wavelength-selective radiation absorbing coating layer comprises at least one dye.

Embodiment 34 is a method of making a retroreflective article. The method includes obtaining a retroreflective layer including a plurality of cube corner elements that collectively form a structured surface opposite a major surface; and forming a conformal wavelength-selective radiation absorbing coating layer by applying a first material having a first binding group to the structured surface, and applying a second material having a second binding group to the first material. The conformal wavelength-selective radiation absorbing coating layer absorbs radiation of at least one selected wavelength.

Embodiment 35 is the method of embodiment 34, wherein at least one of the first material or the second material is applied by layer-by-layer self-assembly.

Embodiment 36 is the method of embodiment 34 or embodiment 35, wherein the first binding group and the second binding group have complementary interactions.

Embodiment 37 is the method of embodiment 36, wherein the complementary interactions are complementary electrostatic interactions.

Embodiment 38 is the method of any of embodiments 34-37, wherein the first binding group is a polycation and the second binding group is a polyanion.

Embodiment 39 is the method of any of embodiments 34-37, wherein the first binding group is a polyanion and the second binding group is a polycation.

Embodiment 40 is the method of embodiment 38 or embodiment 39, wherein the polycation is selected from the group consisting of polydiallyldimethylammonium chloride, polyethylenimine, polyallylamine, poly(2-(trimethylamino)ethyl methacrylate, and copolymers thereof.

Embodiment 41 is the method of any of embodiments 34-40, further including providing a sealing layer; and forming a low refractive index layer between the sealing layer and the conformal wavelength-selective radiation absorbing coating layer.

Embodiment 42 is the method of embodiment 41, wherein the sealing layer includes one of a pressure sensitive adhesive or a hot-melt adhesive.

Embodiment 43 is the method of any of embodiments 34-40, further including vapor coating a metallic layer on the conformal wavelength-selective radiation absorbing coating layer.

Embodiment 44 is the method of embodiment 43, wherein the metallic layer includes aluminum or silver.

Embodiment 45 is the method of any of embodiments 34-44, further including applying a dielectric mirror on the conformal wavelength-selective radiation absorbing coating layer.

Embodiment 46 is the method of any of embodiments 34-45, wherein the first material includes a polyelectrolyte and the second material includes nanoparticles.

Embodiment 47 is the method of any of embodiments 34-46, wherein one of the first material or the second material includes at least one wavelength-selective radiation absorbing material.

Embodiment 48 is the method of any of embodiments 34-47, wherein one of the first material or the second material includes a) a pigment functionalized with the first binding group or the second binding group; b) a dye including at least one functional group selected from sulfonate, carboxylate, phosphonate, amine, ammonium, sulfonium, phosphonium, or combinations thereof; or c) combinations of a) and b).

Embodiment 49 is the method of any of embodiments 34-48, wherein the conformal wavelength-selective radiation absorbing coating layer has a thickness between 10 nm and 2 micrometers.

Embodiment 50 is the method of embodiment 49, wherein the thickness is between 10 nm and 400 nm.

Embodiment 51 is the method of embodiment 49 or embodiment 50, wherein the thickness is between 50 nm and 150 nm.

Embodiment 52 is the method of embodiment 34, wherein the first material is a polycation and the first material contacts the cube corner elements.

Embodiment 53 is the method of any of embodiments 34-52, wherein the conformal wavelength-selective radiation absorbing coating layer absorbs at least one wavelength between 350 nm and 10,000 nm.

Embodiment 54 is the method of any of embodiments 34-53, wherein the conformal wavelength-selective radiation absorbing coating layer absorbs at least one wavelength between 350 nm and 1400 nm.

Embodiment 55 is the method of any of embodiments 34-53, wherein the conformal wavelength-selective radiation absorbing coating layer absorbs at least one wavelength between 350 nm and 750 nm.

Embodiment 56 is the method of any of embodiments 34-54, wherein the conformal wavelength-selective radiation absorbing coating layer absorbs at least one wavelength between 750 nm and 1400 nm.

Embodiment 57 is the method of any of embodiments 34-56, wherein the conformal wavelength-selective radiation absorbing coating layer includes nanoparticles having an average particle size of between 5 nm and 300 nm.

Embodiment 58 is the method of any of embodiments 34-57, wherein the retroreflective article exhibits a coefficient of retroreflection ($R_A$) of 35 candela/lux/m$^2$ (Cd/lux/m$^2$) or greater at an observation angle of 0.2 degrees and an entrance angle of +5 degrees.

Embodiment 59 is the method of any of embodiments 34-58, wherein the retroreflective article exhibits a coefficient of retroreflection ($R_A$) of 8 Cd/lux/m$^2$ or greater at an observation angle of 1.5 degrees and an entrance angle of +5 degrees.

Embodiment 60 is the method of any of the preceding embodiments, wherein the conformal wavelength-selective radiation absorbing coating layer comprises at least one dye.

EXAMPLES

Objects and advantages of this disclosure are further illustrated by the following examples, but the particular materials and amounts thereof recited in these examples, as well as other conditions and details, should not be construed to unduly limit this disclosure.

TABLE 1

Materials

| Abbreviation/Trade Designation | Material | Source |
| --- | --- | --- |
| EBECRYL 3720 | Bisphenol A epoxy diacrylate | Cytec (Woodland Park, New Jersey) |
| TMPTA | Trimethylol propane triacrylate | Cytec |
| HDDA | 1,6 hexanediol diacrylate | Cytec |
| LUCIRIN TPO | Photoinitiator | BASF (Florham Park, New Jersey) |
| DAROCURE 1173 | Photoinitiator | BASF |
| 14286 PETG | Polyethylene terephthalate glycol pellets | Eastman (Kingsport, Tennessee) |
| X6715 | Dual-layer construction including a first layer comprising PET and a second layer, adjacent to the first layer, comprising an amorphous PET | DuPont Teijin Films (Chester, Virginia) |

TABLE 1-continued

Materials

| Abbreviation/ Trade Designation | Material | Source |
|---|---|---|
| PDAC | Poly(diallyl-dimethyl ammonium chloride), molecular weight 100-200K | Sigma-Aldrich Co. (St. Louis, Missouri) |
| PEI | Polyethylenimine, branched (PEI), molecular weight 25K | Sigma-Aldrich Co. |
| PAA | Polyacrylic acid (PAA), molecular weight 45-80K available under the trade designation ACUMER 1510) | Dow Chemical Co. (Midland, Michigan) |
| COJ250C | Cyan nano-pigment, 91 nm diameter, sulfonate functionalized, available under the trade designation CAB-O-JET 250C | Cabot Corporation (Boston, Massachusetts) |
| COJ260M | Magenta nano-pigment, 105 nm diameter, sulfonate functionalized, available under the trade designation CAB-O-JET 260M | Cabot Corporation |
| Chlorophenol red | Dye | Sigma-Aldrich Co |
| NaCl | Sodium chloride | Sigma-Aldrich Co. |
| NaOH | Sodium hydroxide (1M in water) | Avantor Performance Materials (Central Valley, PA) |

Method for Preparing a Retroreflective Layer

A retroreflective layer was prepared by casting cube corner elements onto a body layer and subsequently curing the cube corner elements, as generally described in U.S. Pat. No. 7,862,187 (Thakkar et al.), the disclosure of which is incorporated herein by reference in its entirety. A dual-layer body layer comprising a first layer of poly(ethylene terephthalate) (PET) and a second layer of amorphous PET was obtained as a multilayer film from Dupont Teijin Films, Chester, VA, under the trade designation "MELINEX X6715", as generally described in U.S. Patent Publication No. 2016/0209558 (Chatterjee et al.), incorporated by reference herein in its entirety.

A cube corner composition was prepared by combining 25 weight percent (wt. %) Ebecryl 3720, 50 wt. % TMPTA, 25 wt. % HDDA. 0.5 parts per hundred weight (pph) Lucirin TPO and 0.5 pph Darocur 1173. Cube corner elements were formed by casting the cube corner composition into a microstructured tool and subsequently onto the amorphous PET layer of the dual-layer body layer. The cube corner elements were subsequently cured using Fusion D UV lamps (Heraeus Nobelight America LLC, Gaithersburg, MD) operating at 600 W/inch.

Method for Preparing Conformal Wavelength-Selective Radiation Absorbing Coating Layers Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. *Automated Process for Improved Uniformity and Versatility of Layer-by-Layer Deposition, Langmuir* 2007, 23, 3137-3141. The apparatus comprises pressure vessels loaded with the coating solutions. Spray nozzles with a flat spray pattern (from Spraying Systems, Inc., Wheaton, Illinois) are mounted to spray the coating solutions and rinse water at specified times, controlled by solenoid valves. The pressure vessels (Alloy Products Corp., Waukesha, WI) containing the coating solutions were pressurized with nitrogen to 30 psi (0.2 mPa), while the pressure vessel containing de-ionized (DI) water was pressurized with air to 30 psi (0.2 mPa). Flow rates from the coating solution nozzles were each about 10 gallons per hour (38 L/h), while flow rate from the DI water rinse nozzles was about 40 gallons per hour (150 L/h). The retroreflective layer (made as described in the "Method for Preparing a Retroreflective Layer") was cut to a size of about 8"×10" (20 cm×25 cm) and was adhered with 3M (3M Company, St. Paul, MN) DP-100 two-part epoxy to a glass plate (12"×12"×⅛" thick) (30 cm×30 cm×0.32 cm thick), mounted on a vertical translation stage, and held in place with a vacuum chuck. Immediately prior to coating, the retroreflective layer was subjected to air corona treatment with a BD-20AC Laboratory Corona Treater (Electro-Technic Products, Chicago, IL). In a typical coating sequence, the polycation (e.g., PDAC) solution was sprayed onto the substrate while the stage moved vertically downward at 76 millimeters per second (mm/sec). Next, after a dwell time of about 12 sec, DI water was sprayed onto the substrate while the stage moved vertically upward at 102 mm/sec. Next, after a dwell time of approximately 4 sec, the polyanion (e.g., nano-pigment) solution was sprayed onto the substrate while the stage moved vertically downward at 76 mm/sec. Another dwell period of 12 sec was allowed to elapse. Finally, DI water was sprayed onto the substrate while the stage moved vertically upward at 102 mm/sec, and a dwell period of 4 sec was allowed to elapse. The above sequence was repeated to deposit a desired number of "bi-layers". Coatings were dried with compressed air or nitrogen following the coating process. The layer-by-layer coatings are generally denoted as (Polycation/Polyanion)$_n$ where n is the number of deposited "bi-layers". A "bi-layer" refers to the combination of a polycation layer and a polyanion layer.

Coating solutions were prepared as follows. PDAC at 20 wt. % in water was diluted from 20 wt. % to a concentration of 0.32 wt. % with DI water in a volume of 3500 mL. COJ250C and COJ260M were each diluted to a concentration of 0.10 wt. % with DI water in a volume of 3500 mL. NaCl was added to both the PDAC solution and pigment suspensions to a concentration of 0.05 M. PEI was diluted from 100% solids to 0.1 wt. % with DI water in a volume of 3500 mL. PAA was diluted from 25 wt. % to 0.2 wt. % with DI water in a volume of 3500 mL and adjusted to pH 4.0 with 1 M NaOH.

Method for Measuring Retroreflected Brightness and Color

Retroreflected brightness and color were measured with a RoadVista (San Diego, CA) Model 932 handheld sign retroreflectometer at specified observation and entrance angles. The samples were placed on a lab bench and measured with the structured surface facing downward. The retroreflected brightness is denoted as the coefficient of retroreflection, $R_A$, in units of Cd/lux/m$^2$. The retroreflected color is reported with unitless "x" and "y" values corresponding to the CIE1931xy color space.

Examples 1 & 2 (EX1 & EX2)—Retroreflective Articles with Cyan Pigment Coatings (PDAC/COJ250C)$_n$ with n=5 bi-layers (EX1) and n=10 bi-layers (EX2) were made via the "Method for Preparing Conformal Wavelength-Selective Radiation Absorbing Coating Layers". The coatings were applied to the structured side (i.e., cube corner side) of the sheeting. Coating thickness for a (PDAC/COJ250C)$_{20}$ (i.e., 20 bi-layer) coating deposited onto glass was 340 nm as measured with a Dektak XT stylus profilometer (Bruker Nano, Inc., Tucson, AZ)

after scoring the coating with a razor blade. The estimated thicknesses of the coatings of EX1 and EX2, corresponding with observed linear growth rates, are 85 nm and 170 nm, respectively.

Examples 3 & 4 (EX3 & EX4)—Retroreflective Articles with Magenta Pigment Coatings $(PDAC/COJ260M)_n$ with n=5 bi-layers (EX3) and n=10 bi-layers (EX4) were made via the "Method for Preparing Conformal Wavelength-Selective Radiation Absorbing Coating Layers". The coatings were applied to the structured side (i.e., cube corner side) of the sheeting. Coating thickness for a $(PDAC/COJ260M)_{20}$ (i.e., 20 bi-layer) coating deposited onto glass was 313 nm as measured with a Dektak XT stylus profilometer (Bruker Nano, Inc., Tucson, AZ) after scoring the coating with a razor blade. The estimated thicknesses of the coatings of EX3 and EX4, corresponding with observed linear growth rates, are 78 nm and 157 nm, respectively.

Examples 5 & 6 (EX5 & EX6)—Retroreflective Articles with Pigment Coatings and Metallic Layers An aluminum coating with thickness of about 100 nm was deposited adjacent to the conformal wavelength-selective radiation absorbing coatings of Example 1 and Example 3 above (to generate Example 5 and Example 6, respectively) using a custom-built vacuum thermal evaporator. A ceramic hot bar, resistively heated at 5-8 V and about 500 Amps, was fed with an Al wire source. The vacuum level was below $10^{-6}$ Torr ($1.3 \times 10^{-4}$ Pa).

Example 7 (EX7)—Retroreflective Article with Pigment Coating and Sealing Layer A pressure sensitive adhesive film (i.e., a sealing layer comprising a barrier layer), generally as described in Comparative Example A of PCT Publication No. WO 2017/004247 (Patel et al.) was laminated by hand with a small hand roller to a portion of the film from Example 1 using firm pressure.

Examples 8 & 9 (EX8 & EX9)—Retroreflective Articles with Colored Dye Coatings $(PEI/PAA)_n$ with n=4 bi-layers (used for EX8) and n=4.5 bi-layers (used for EX9) were made via the "Method for Preparing Conformal Wavelength-Selective Radiation Absorbing Coating Layers". The coatings were applied to the structured side (i.e., cube corner side) of the sheeting. A $(PEI/PAA)_4$ coating deposited on a Si wafer had a thickness of 166 nm as measured with a spectroscopic ellipsometer (J. A. Woollam M2000, Lincoln, Nebraska), wherein the coating was modeled as a Cauchy layer. The retroreflective layers with the $(PEI/PAA)_4$ and $(PEI/PAA)_{4.5}$ conformal coating layers were each soaked in a 0.05 wt. % solution of chlorophenol red (Sigma Aldrich Co., St. Louis, Missouri) for 1 minute, rinsed with DI water, and dried under a stream of compressed air to generate EX8 and EX9, respectively. EX8 appeared yellow/orange in color. EX9 appeared red/purple in color.

Comparative Examples 1-3 (CE1-CE3)

$(PDAC/COJ250C)_n$ with n=5 bi-layers (CE1), 10 bi-layers (CE2), and 15 bi-layers (CE3) were made via the "Method for Preparing Conformal Wavelength-Selective Radiation Absorbing Coating Layers". The coatings were applied to the planar side of the retroreflector layer. Based on the coating thickness measured on a $(PDAC/COJ250C)_{20}$ coating, the estimated coating thicknesses for CE1, CE2, and CE3 are 85 nm, 170 nm, and 255 nm, respectively.

Tables 2, 3, and 6 below show the retroreflected brightness for the Examples and Comparative Examples. Tables 4, 5, and 7 below show the retroreflected color for the Examples and Comparative Examples.

TABLE 2

Retroreflection coefficients ($R_A$) for EX1-4, CE1-3 in units of $Cd/lux/m^2$ at 0.2° observation angle, 0° presentation angle, 0° orientation.

|  | EX1 | EX2 | EX3 | EX4 | CE1 | CE2 | CE3 |
|---|---|---|---|---|---|---|---|
| Entrance: 5° | 142 | 36.4 | 145 | 51.6 | 483 | 307 | 253 |
| Entrance: 20° | 112 | NM | NM | NM | 343 | 219 | 177 |
| Entrance: 30° | 51.6 | NM | NM | NM | 119 | 72 | 53.3 |

NM = not measured.

TABLE 3

Retroreflection coefficients ($R_A$) for EX1, CE1-3 in units of $Cd/lux/m^2$ at 1.5° observation angle, 0° presentation angle, 0° orientation.

|  | EX1 | CE1 | CE2 | CE3 |
|---|---|---|---|---|
| Entrance: 5° | 8.40 | 26.4 | 18.8 | 13.4 |
| Entrance: 20° | 10.6 | 29.1 | 21.8 | 16.7 |
| Entrance: 30° | 3.6 | 9.6 | 8.0 | 5.4 |

TABLE 4

Retroreflected color for EX1-4, CE1-3 at 0.2° observation angle, 0° presentation angle, 0° orientation.

| Entrance: | 5° x | 5° y | 20° x | 20° y | 30° x | 30° y |
|---|---|---|---|---|---|---|
| EX1 | 0.127 | 0.325 | 0.124 | 0.318 | 0.110 | 0.323 |
| EX2 | 0.130 | 0.349 | NM | NM | NM | NM |
| EX3 | 0.653 | 0.313 | NM | NM | NM | NM |
| EX4 | 0.617 | 0.340 | NM | NM | NM | NM |
| CE1 | 0.263 | 0.452 | 0.262 | 0.457 | 0.269 | 0.438 |
| CE2 | 0.177 | 0.456 | 0.170 | 0.448 | 0.167 | 0.452 |
| CE3 | 0.101 | 0.355 | 0.099 | 0.352 | 0.097 | 0.349 |

NM = not measured

TABLE 5

Retroreflected color for EX1, CE1-3 at 1.5° observation angle, 0° presentation angle, 0° orientation.

|  | EX1 | | CE1 | | CE2 | | CE3 | |
|---|---|---|---|---|---|---|---|---|
|  | x | y | x | y | x | y | x | y |
| Entrance: 5° | 0.124 | 0.331 | 0.263 | 0.452 | 0.176 | 0.456 | 0.101 | 0.355 |
| Entrance: 20° | 0.123 | 0.317 | 0.261 | 0.458 | 0.170 | 0.448 | 0.100 | 0.353 |
| Entrance: 30° | 0.109 | 0.322 | 0.258 | 0.448 | 0.163 | 0.451 | 0.098 | 0.351 |

The data in Tables 4 and 5 show that a 15 bi-layer coating on the planar side (i.e., CE3) is needed to attain a similar location in color space as a 5 bi-layer coating on the cube side (i.e., EX1). Thus, EX1 is more efficient (i.e., requiring fewer layers) compared to CE3. Without wishing to be bound by theory, this result makes sense because the retroreflected light would "see" the coating on the cube corner side three times compared to once for a coating on the planar side, due to the bounces of the retroreflected light on each of three cube corner facets prior to exiting the sheeting.

TABLE 6

Retroreflection coefficients ($R_A$) for EX5-9 in units of $Cd/lux/m^2$ at 0.2° observation angle, 0° presentation angle, 0° orientation.

|  | EX5 | EX6 | EX7 | EX8 | EX9 |
|---|---|---|---|---|---|
| Entrance: 5° | 49.3 | 63.3 | 38.6 | 30.5 | 7.0 |
| Entrance: 20° | 43.1 | 57.5 | 30.5 | 12.3 | 5.0 |
| Entrance: 30° | 36.4 | 47.5 | 12.5 | 4.3 | 0.6 |

NM = not measured.

TABLE 7

Retroreflected color for EX5-9 at 0.2° observation angle, 0° presentation angle, 0° orientation.

| | EX5 | | EX6 | | EX7 | | EX8 | | EX9 | |
|---|---|---|---|---|---|---|---|---|---|---|
| | x | y | x | y | x | y | x | y | x | y |
| Entrance: 5° | 0.316 | 0.389 | 0.590 | 0.373 | 0.136 | 0.322 | 0.548 | 0.433 | 0.460 | 0.332 |
| Entrance: 20° | 0.313 | 0.396 | 0.588 | 0.375 | 0.127 | 0.310 | 0.551 | 0.424 | 0.478 | 0.320 |
| Entrance: 30° | 0.308 | 0.402 | 0.585 | 0.378 | 0.119 | 0.310 | — | — | — | — |

NM = not measured.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. A retroreflective article comprising:
   a retroreflective layer comprising a plurality of cube corner elements that collectively form a structured surface that is opposite a major surface, the structured surface comprising a plurality of geometric structures, some or all of which include three reflective faces configured as a cube corner element; and
   a conformal wavelength-selective radiation absorbing coating layer adjacent to the structured surface, wherein the conformal wavelength-selective radiation absorbing coating layer is non-reflective, and wherein the conformal wavelength-selective radiation absorbing coating layer has a thickness between 10 nanometers (nm) and 2 micrometers.

2. The retroreflective article of claim 1, further comprising a radiation reflecting layer comprising a metallic layer, a dielectric layer, or a combination thereof, adjacent to the conformal wavelength-selective radiation absorbing coating layer.

3. The retroreflective article of claim 1, wherein the conformal wavelength-selective radiation absorbing coating layer absorbs at least one wavelength between 350 nm and 10600 nm.

4. The retroreflective article of claim 1, wherein the conformal wavelength-selective radiation absorbing coating layer absorbs at least one wavelength between 350 nm and 1400 nm.

5. The retroreflective article of claim 1, exhibiting a coefficient of retroreflection ($R_A$) of 35 candela/lux/m² (Cd/lux/m²) or greater at an observation angle of 0.2 degrees and an entrance angle of +5 degrees.

6. The retroreflective article of claim 1, exhibiting a coefficient of retroreflection ($R_A$) of 8 $Cd/lux/m^2$ or greater at an observation angle of 1.5 degrees and an entrance angle of +5 degrees.

7. The retroreflective article of claim 1, further comprising a sealing layer adjacent to the conformal wavelength-selective radiation absorbing coating layer; and a low refractive index layer between the sealing layer and the conformal wavelength-selective radiation absorbing coating layer.

8. The retroreflective article of claim 7, wherein the low refractive index layer comprises one of a low refractive index material or air.

9. The retroreflective article of claim 1, wherein the conformal wavelength-selective radiation absorbing coating layer comprises a first material and a second material, wherein the first material comprises a first binding group and the second material comprises a second binding group, and wherein the first binding group and the second binding group have complementary interactions.

10. The retroreflective article of claim 9, wherein the first material comprises a polyelectrolyte and the second material comprises nanoparticles.

11. The retroreflective article of claim 9, wherein one of the first material or the second material comprises at least one wavelength-selective radiation absorbing material.

12. The retroreflective article of claim 9, wherein one of the first material or the second material comprises a) a pigment functionalized with the first binding group or the second binding group; b) a dye comprising at least one functional group selected from sulfonate, carboxylate, phosphonate, amine, ammonium, sulfonium, phosphonium, or combinations thereof; or c) combinations of a) and b).

13. A method of making a retroreflective article comprising:
   obtaining a retroreflective layer comprising a plurality of cube corner elements that collectively form a structured surface opposite a major surface, the structured surface comprising a plurality of geometric structures, some or all of which include three reflective faces configured as a cube corner element; and
   forming a conformal wavelength-selective radiation absorbing coating layer by applying a first material having a first binding group to the structured surface, and applying a second material having a second binding group to the first material;
   wherein the conformal wavelength-selective radiation absorbing coating layer absorbs radiation of at least one selected wavelength, wherein the conformal wavelength-selective radiation absorbing coating layer has a thickness between 10 nm and 2 micrometers, and wherein the conformal wavelength-selective radiation absorbing coating layer is non-reflective.

14. The method of claim 13, further comprising providing a sealing layer; and forming a low refractive index layer between the sealing layer and the conformal wavelength-selective radiation absorbing coating layer.

15. The method of claim 13, further comprising applying a radiation reflective layer comprising a metallic layer, a dielectric layer, or a combination thereof, on the conformal wavelength-selective radiation absorbing coating layer.

* * * * *